Figure 1A:
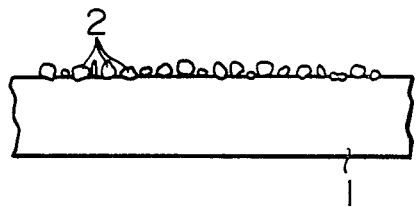
Figure 1B:
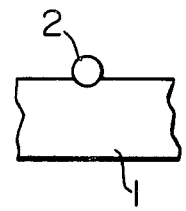

United States Patent [19]

Ochi

[11] Patent Number: 4,556,595
[45] Date of Patent: Dec. 3, 1985

[54] PRESSURE-SENSITIVE ADHESIVE SHEET STRUCTURE HAVING RELOCATABLE PROPERTIES

[75] Inventor: Katsura Ochi, Uozu, Japan

[73] Assignee: Nippon Carbide Kogyo Kabushiki Kaisha

[21] Appl. No.: 397,913

[22] Filed: Jul. 13, 1982

[30] Foreign Application Priority Data

Jul. 16, 1981 [JP] Japan ............... 56-109972

[51] Int. Cl.⁴ .................. B32B 27/14; B32B 27/04
[52] U.S. Cl. .................................. 428/143; 428/147; 428/213; 428/323; 428/327; 428/329; 428/343; 428/355
[58] Field of Search .............. 428/143, 147, 323, 327, 428/328, 329, 330, 332, 324, 343, 355, 356, 42, 144, 148, 149, 213; 427/208.4

[56] References Cited

U.S. PATENT DOCUMENTS

| | | | |
|---|---|---|---|
| 3,146,799 | 9/1964 | Fekete | 428/356 |
| 3,301,741 | 1/1967 | Henrickson et al. | 428/40 |
| 3,314,838 | 4/1967 | Erwin | 428/343 |
| 3,331,729 | 7/1967 | Danielson et al. | 428/40 |
| 4,150,187 | 4/1979 | Brown | 428/144 |
| 4,223,067 | 9/1980 | Levins | 428/325 |

Primary Examiner—Paul J. Thibodeau
Attorney, Agent, or Firm—Sherman & Shalloway

[57] ABSTRACT

A pressure-sensitive adhesive sheet structure having relocatable properties composed of a pressure-sensitive adhesive layer and non-adhesive solid particles; characterized in that the non-adhesive solid particles having a diameter smaller than the thickness of the adhesive layer and an average diameter of less than 10 $\mu$ are randomly but uniformly distributed over the surface of the adhesive layer, or are randomly but uniformly distributed and partially or fully embedded in the surface layer of the adhesive layer.

13 Claims, 8 Drawing Figures

PRESSURE-SENSITIVE ADHESIVE SHEET STRUCTURE HAVING RELOCATABLE PROPERTIES

This invention relates to a pressure-sensitive adhesive sheet structure having re-locatable, or re-positionable, properties.

More specifically, this invention relates to a pressure-sensitive adhesive sheet structure having re-locatable properties composed of a pressure-sensitive adhesive layer and non-adhesive solid particles, characterized in that non-adhesive solid, i.e. non-hollow particles having a diameter smaller than the thickness of the adhesive layer and an average diameter of less than $10\mu$ are randomly but uniformly distributed over the surface of the adhesive layer, or are randomly but uniformly distributed and partially or fully embedded in the surface layer of the adhesive layer.

The sheet structure of the invention exhibits a number of unique improved properties. For example, in application to the surface of a substrate, the adhesive layer of this structure shows an initial force of adhesion (the adhesion strength, expressed by a loop tack, upon light contact with the surface of the substrate before pressure bonding) low enough to permit easy registering of the adhesive layer with a desired site of bonding on the substrate surface and as required to make possible relocation of the adhesive layer, for example for avoiding occurrence of bonding imperfections such as wrinkles, foams and swellings. After the bonding, the rate of increase of the adhesion strength of the sheet structure with time is very high, the adhesion strength so attained is also very high, and the surface of the sheet structure after the pressure bonding is smooth. Furthermore, the sheet structure having such an adhesive structure is easy to produce.

Pressure-sensitive adhesive sheet structures composed of a substrate such as a tape, film or sheet and a pressure-sensitive adhesive layer formed on its surface are known, and are used for application to the surfaces of substrates in a wide range of uses, for example in signboards, decorative and display applications in automobiles and buildings, and fleet marking of automobiles and containers.

Such pressure-sensitive adhesive layers have a very high initial adhesion strength, or the so-called "quick-grab" properties, and a great deal of expertise is required in bonding them to the surface of substrates. Even skilled workmen experience much difficulty in accurately bonding such a pressure-sensitive adhesive layer to the desired site by one operation, and dislocation from the desired site tends to occur. It is frequently necessary therefore to re-position the adhesive layer to the desired site, or to re-position it in order to avoid the occurrence of bonding imperfections such as wrinkles, foams and swellings. This frequently causes troubles such as the deformation or fracture of the substrate or the occurrence of wrinkles thereon. These troubles are especially pronounced when bonding a pressure-sensitive adhesive sheet structure of a large size.

In order to solve the aforesaid technical problems with the pressure-sensitive adhesive layers, attempts have been made to reduce the initial adhesion strength of the pressure-sensitive layer without a substantial decrease in its desirable adhesion strength after pressure bonding.

Such a pressure-sensitive adhesive sheet structure having relocatable properties is disclosed, for example, in Japanese Patent Publication No. 3120/1969 (corresponding to U.S. Pat. No. 3,331,729). This patent document discloses a structure having a pressure-sensitive adhesive layer having thin-walled fragile microballoons, collapsible under hand pressure, randomly uniformly distributed over and partially embedded within the surfaces of the structure. According to this technique, the initial adhesion strength of the adhesive layer is reduced by distributing thin-walled fragile microballoons collapsible under hand pressure such as hollow thin-walled fragile microspheroids composed of urea-formaldehyde resin and small fragile hollow glass spheroids over at least one surface of the pressure-sensitive adhesive layer, optionally partially embedded in the surface. This imparts relocatable properties to the pressure-sensitive adhesive sheet structure. The structure is positioned with its pressure-sensitive adhesive layer having microballoons being in contact with a substrate, and then bonded under pressure. Under the pressure applied, the hollow particles collapse, permitting the adjoining adhesive surfaces to contact and adhere to the surface of the substrate. This patent document states that best results are achieved with rather closely graded products in the range of diameters from about 40 to about $100\mu$, but very small spheres are more difficult to handle and the large spheres cause excessive surface irregularity of the coating, and that cuts of about 40 to 70 or about 70 to $100\mu$ average diameter microspheres have been found equally desirable.

Another proposal is made in Japanese Patent Publication No. 17040/1969 (corresponding to U.S. Pat. No. 3,301,741). This patent document discloses an adhesive sheet material capable of being slit into position or an adhesive-receptive work-surface and of then being adhesively anchored in said position by simple application of pressure, said sheet material including a thin continuous layer of pressure-sensitive adhesive having a pebbly contour provided by a uniform pattern of small protrusions of said adhesive separated by intervening planar adhesive surfaces, said protrusions being individually capped with continuous non-adhesive fragile protective coverings extending over at least about one-fourth the height of said protrusions.

Still another proposal is made in Japanese Patent Publication No. 17074/1970 (corresponding to U.S. Pat. No. 3,314,838) which discloses an adhesive composition adapted for depositing pressure-sensitive adhesive coatings capable of slidably supporting flexible adhesive-receptive sheet materials laid thereagainst, said composition being a spreadable liquid comprising a pressure-sensitive adhesive, a volatile liquid vehicle for said adhesive in an amount sufficient to impart spreadability, and a quantity of small rigid liquid-weight fragile thin-walled hollow spheroidal particles having a particle size within the range of about 20 to about 500 microns and in an amount of from about one to about 50 percent by volume of the total volume of said spheroids and said adhesive.

According to these previously proposed techniques, it is difficult to reduce the initial adhesion strength to a satisfactory degree without exerting substantial adverse effects on the adhesion strength attained by bonding, and if the initial adhesion strength is reduced to a satisfactory degree, adverse effects are exerted substantially on the adhesion strength after bonding.

It has been found that even when the hollow thin-walled fragile microballoons collapsible under pressures applied at the time of bonding in the first and third prior techniques cited above and the non-adhesive fragile protective coverings in the second prior technique cited above are placed under pressures sufficient to cause them to collapse during pressure bonding, they tend to remain on the bonding surface of the adhesive as relatively large fragments which do not easily disperse into the inside of the adhesive layer, and adversely affect the adhesion strength of the adhesive layer after bonding. Furthermore, these fragments deteriorate the surface condition of the bonded structure, and it is difficult to provide a smooth surface. In the first prior technique, it is difficult to distribute the fragile and collapsible hollow balloons over the surface portion of the adhesive layer, partly embedded therein, and partly protruding therefrom, and the desired sheet structure is difficult to manufacture. In the second prior technique, the production of the sheet like material is more difficult and complex.

U.S. Pat. No. 4,223,067 discloses a pressure-sensitive adhesive tape comprising a pressure-sensitive adhesive layer having a thickness exceeding 0.2 mm and consisting essentially of a polymeric pressure-sensitive adhesive matrix and glass microbubbles of specific gravity not exceeding 1.0 dispersed throughout the matrix, the microbubbles having an average diameter of 10 to 200 micrometers, preferably 20 to 80 micrometers, and comprising 20 to 65 volume percent of the pressure-sensitive adhesive layer, the thickness of which exceeds three times the average diameter of the microbubbles and twice the diameter of substantially every microbubble, said matrix being substantially free from voids except for the hollow space of the individual microbubbles. According to this patent, it is stated that microbubbles having an average diameter of 10 to 200 micrometers, preferably 20 to 80 micrometers, should be used because microbubbles of smaller average diameter would tend to be unduly expensive, whereas it would be difficult to coat out a polymerizable mixture containing microbubbles of larger average diameter. Furthermore, unlike the above-cited prior techniques, the microbubbles in this patent are designed so as not to collapse nor break under pressures applied at the time of bonding. In this patent, the thickness of the pressure-sensitive adhesive layer should exceed three times the average diameter of the microbubbles and twice the diameter of substantially every microbubble. This allows the microbubbles to migrate within the adhesive under applied pressure instead of breaking, and the adhesive can flow into intimate contact with rough or uneven surfaces, while retaining its foam-like character. According to this prior technique, glass microbubbles are used as a filler for obtaining a foam-backed tape having an adhesive layer exceeding 0.2 mm in thickness. The pressure-sensitive adhesive tape of this patent has the disadvantage that its surface condition after bonding is poor, and a smooth surface cannot be obtained. Its initial adhesion strength is neither fully satisfactory.

We have now found that the aforesaid defects and disadvantages of the prior techniques can be overcome by using non-adhesive solid particles which are not used in the prior techniques and have a much smaller particle size than the microballoons or microbubbles previously proposed, and positioning the aforesaid particles on the surface, or in the surface layer, of a pressure-sensitive adhesive layer.

Our investigations have now led to the discovery that the defects and disadvantages of the prior techniques can be overcome by a structure in which non-adhesive solid particles which have an average particle diameter small enough to withstand collapsing or breaking under the pressure applied during bonding are located only on the surface, or in the surface layer, of a pressure-sensitive adhesive layer.

More specifically, we have found that a pressure-sensitive adhesive layer having a layer of uniformly dispersed non-adhesive solid particles having a particle diameter less than the thickness of the pressure-sensitive adhesive layer and an average particle diameter of less than 10 microns on the surface, or in the surface layer, of the pressure-sensitive adhesive layer has an initial adhesion strength low enough to permit easy registering of the adhesive layer with a desired site of bonding on the surface of a substrate and as required to make possible relocation of the adhesive layer for avoiding the occurrence of bonding imperfections such as wrinkles, foams or swellings.

Furthermore as shown in Examples and Comparative Examples given hereinbelow, the present invention brings about the unexpected advantage that the rate of increase of the adhesion strength of the sheet structure with the lapse of time after the pressure bonding operation and the adhesion strength itself so increased become very high within a relatively short period of time, and a smooth surface is obtained after the pressure bonding. It has also been found that the excellent pressure-sensitive adhesive layer can be produced industrially advantageously by easier and simpler means than in the prior art.

It is not entirely clear why the rate of increase of the adhesion strength increases markedly, but we presume that the following is one main cause. Since the solid particles used in this invention existing on the surface, or in the surface layer, of the adhesive layer are solid particles having a specified fine particle diameter, they do not easily break nor collapse under ordinary pressure bonding conditions, and tend greatly to migrate into, and be embedded and dispersed in, the pressure-sensitive adhesive layer by a bonding operation. Of course, the present invention is not bound in any way to such a presumption.

As shown in a Comparative Example given hereinbelow, if the solid particles having the specified particle diameter are used as a filler for the adhesive layer and incorporated therein uniformly, the desired reduction of the initial adhesion strength cannot be achieved.

It is a primary object of this invention therefore to provide improved pressure-sensitive layer or sheet structure.

The above and other objects and advantage of this invention will become more apparent from the following description.

Various pressure-sensitive adhesives are known and utilized in this invention. Preferably, adhesives of the type which show tackiness at room temperature are used in this invention. Examples of such pressure-sensitive adhesives include rubber-type adhesives, acrylic adhesives, vinyl acetate-type adhesives and urethan-type adhesives either singly or in combination.

Examples of the rubber-type adhesives are adhesives composed of natural rubber, isoprene rubber, styrene-butadiene rubber, styrene-butadiene block copolymer, styrene-isoprene block copolymer, butyl rubber, polyisobutylene, silicone rubber, polyvinyl isobutyl ether, chloroprene rubber and nitrile rubber, mixtures of these, and adhesives comprising at least one of these as a main component. Those which have some crosslinked structure between the molecules can also be utilized preferably.

Examples of the acrylic adhesives are those which are composed of homopolymers, copolymers or crosslinked copolymers of at least one acrylic or methacrylic component, for example acrylic esters such as methyl acrylate, ethyl acrylate, n-propyl acrylate, isopropyl acrylate, n-butyl acrylate, isobutyl acrylate, tert.-butyl acrylate, amyl acrylate, hexyl acrylate, octyl acrylate, 2-ethylhexyl acrylate, undecyl acrylate or lauryl acrylate, and optionally as a comonomer, a carboxyl-containing monomer such as (meth)acrylic acid [the expression "(meth)acrylic" acid denotes acrylic acid and methacrylic acid], itaconic acid, crotonic acid, maleic acid, maleic anhydride or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl(meth)acrylamide or N-ethyl(meth)acrylamide, a methylol group-containing monomer such as N-methylol(meth)acrylamide or dimethylol(meth)acrylamide, an amino-containing monomer such as aminoethyl(meth)acrylate, dimethylaminoethyl(meth)acrylate or vinylpyridine, or a non-functional monomer such as ethylene, propylene, styrene or vinyl acetate; mixtures thereof; and adhesives containing at least one such adhesives as a main component.

Examples of the vinyl acetate-type adhesives are those which are composed of polyvinyl acetate, a copolymer of vinyl acetate with a copolymerizable monomer such as ethylene or vinyl chloride, a mixture thereof, or those which comprises at least one of these as a main component.

Examples of the urethan-type adhesives are those which are composed of polymeric compounds formed by the reaction of an isocyanate such as triphenylmethane-p,p',p"-triisocyanate, hexamethylene diisocyanate, diphenylmethane 4,4'-diisocyanate, or toluenediisocyanate with a compound having an active hydrogen atom such as polyesters having active hydrogen, polyether glycol, polyacrylates or polyamides, mixtures thereof, and those which contain at least one of these as a main component.

The above-exemplified pressure-sensitive adhesives can be properly selected and used in the pressure-sensitive adhesive layer of this invention. When it is desired to have a high adhesion strength developed rapidly after pressure bonding, relatively soft adhesives are preferably used, and when it is desired to have an adhesion strength developed relatively slowly after pressure bonding, relatively hard adhesives are preferably used. The degree of softness of the adhesive can be properly selected also according to the ease of the bonding operation, the initial adhesiveness, and the particle size and amount of the solid particles, and can be varied over a wide range. For example, there may be used adhesives which have a tack (determined by a ball rolling method—J. Dow method—in accordance with JIS Z-0237) of 1 to 25, preferably 5 to 20.

The pressure-sensitive adhesive layer of this invention can be utilized advantageously as an adhesive layer in various modes in a pressure-sensitive adhesive structure. For example, it is used in a pressure-sensitive adhesive sheet structure in which a layer of dispersed non-adhesive solid particles having a particle diameter smaller than the adhesive layer and an average particle diameter of less than $10\mu$ is formed on one surface of the pressure-sensitive adhesive layer and a releasing agent layer is placed thereon, and on the other surface, there is a substrate such as a tape, film or sheet. In use, the release sheet layer is removed, and the dispersed layer of the adhesive layer is pressure-bonded to the surface of a bonding substrate so that the substrate of the above structure becomes a surface of the bonded article. Alternatively, the aforesaid layer of the dispersed hollowless solid particles and the release sheet layer are formed on both surfaces of the adhesive layer, and in use, one of the release sheet layer is removed and the dispersed layer is pressure-bonded to the surface of a bonding substrate and then the other release sheet layer is removed and the revealed dispersed layer is pressure-bonded to the surface of another bonding substrate. Thus, according to this mode, two substrates can be bonded to each other through the pressure-sensitive adhesive layer of this invention.

The bonding substrate may be in the form of a tape, foil, film, sheet, etc. made of plastics, papers, cloths, metals, and laminates of these in desired combinations. These substrates may have any desired color, printed characters, design patterns, etc. as is the case with colored sheets and printed and decorative sheets.

In the pressure-sensitive adhesive layer, there are used solid particles which have a particle diameter smaller than the thickness of the pressure-sensitive adhesive layer and an average particle diameter of less than $10\mu$ and are non-adhesive (with little or no adhesiveness and thus without the tendency to increasing of the initial adhesion strength of the adhesive layer). They differ from a layer of uniformly distributed non-adhesive hollow solid balloons easily breakable or collapsible or the adhesive layer having small projections covered with a non-adhesive fragile protective outer covering in the prior techniques discussed hereinabove. Since the solid particles have a particle diameter smaller than the thickness of the pressure-sensitive adhesive layer and an average particle diameter of less than $10\mu$, the solid particles are not likely to break or collapse under the pressure bonding conditions. This is also attributed to the fact that they are ordinary solid particles and not hollow balloons which must be produced through a special process and are expensive. In addition, fragments of the solid particles are not likely to remain on the bonded surface of the adhesive layer, and by the bonding operation, are embedded and dispersed randomly in the pressure-sensitive adhesive layer, thus tending to act as a favorable filler. It seems that this tendency has to do with the marked increase of the adhesive force and the rate of its increase within a short period of time, the properties uniquely exhibited by the pressure-sensitive adhesive layer of this invention.

The solid particles have an average particle diameter of less than $10\mu$, preferably not more than about $6\mu$, more preferably not more than about $5\mu$, especially preferably from about $0.001\mu$ to about $3\mu$, above all not more than about $2\mu$. If the average diameter is at least $10\mu$, high pressures may be required for bonding, or chances of the solid particles remaining on the bonded side of the adhesive layer increase to cause inconvenience in increasing the adhesion strength of the sheet structure. Furthermore, if the average particle diameter becomes excessively large, the smoothness of the surface of the substrate after bonding is lost and a rough uneven surface results. Accordingly, the average particle diameter of the solid particles used in this invention should be less than 10μ.

The non-adhesive solid particles used in this invention have a diameter smaller than the thickness of the adhesive layer. After the pressure bonding operation, the solid particles are conveniently embedded and dispersed in the adhesive layer. In order to cause them to perform this function fully, the ratio of the thickness (μ) of the adhesive layer to the average diameter (μ) of the solid particles is preferably at least 2, more preferably at least 10, especially preferably at least 30. There is no particular upper limit to this, but for example, its upper limit is 100,000, preferably 10,000.

The thickness of the adhesive layer can be properly selected. But in view of adhesion strength and economy, it is, for example, about 10 to about 100μ, preferably about 20 to about 50μ, especially preferably about 25 to about 40μ.

There is no particular restriction on the kind of the non-adhesive solid particles so long as they satisfy the aforesaid particle size conditions and are not special kinds of particles which satisfy the aforesaid particle size conditions but which are still fragile and easily collapsible. Preferably, there are selected those kinds of solid particles which are comparably non-collapsible and non-fragile under conditions for bonding to a desired site while satisfying the aforesaid particle size conditions.

Examples of such solid particles include inorganic solid particles such as calcium carbonate, barium carbonate, calcium sulfate, barium sulfate, aluminum sulfate, molybdenum disulfide, titanium oxide, aluminum hydroxide, alumina, silica, magnesium oxide, calcium oxide, calcium hydroxide, ferrous oxide, and ferric oxide; and organic solid particles such as cured rubbers, ebonite, lignin-phenol resin, styrene resin, metal melamine resin and other resins. They may be used either singly or as mixtures of two or more.

In the pressure-sensitive adhesive layer of this invention, the aforesaid solid particles which satisfy the above-described particle size conditions are randomly but uniformly distributed on at least one surface, or in at least one surface layer, of the pressure-sensitive adhesive layer. The "uniform distribution", as used herein, does not mean that the particles are regularly and uniformly distributed, but it is sufficient that they are dispersed uniformly when observed macroscopically. A specially controlled state of distribution as in the prior art is not required, and for example, the solid particles may be applied to the surface of the pressure-sensitive adhesive layer by such a means as a powder applicator. The amount of the solid particles can be easily selected and determined experimentally as required by those skilled in the art depending upon the degree of softness or hardness of the pressure-sensitive adhesive, the thickness of the adhesive layer, the particle size conditions and type of the solid particles used, the distributed state of the solid particles on the surface of the adhesive layer, the desired initial adhesion strength, etc.

In the pressure-sensitive adhesive layer, a layer of the dispersed fine solid particles is formed on the surface, or in the surface layer, of the pressure-sensitive adhesive layer. This state is shown in the accompanying drawings as a model-like enlarged sectional view.

FIGS. 1a to 4a are enlarged sectional views of several embodiments in which the layer of dispersed fine hollowless solid particles is provided on the surface, or in the surface layer, of the pressure-sensitive adhesive layer, and FIGS. 1b to 4b are more model-like representations of the embodiments shown in FIGS. 1a to 4a.

Figure 2A:
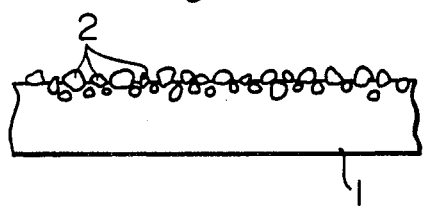
Figure 2B:
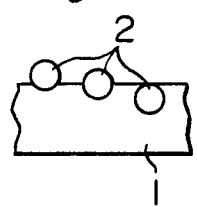
Figure 3A:
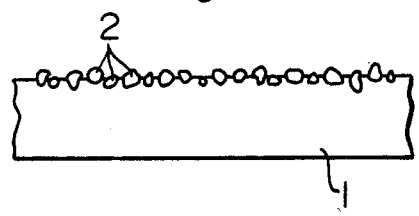
Figure 3B:
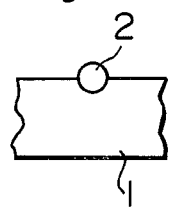
Figure 4A:
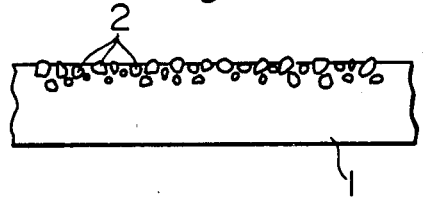
Figure 4B:
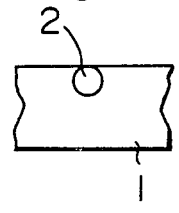

In FIG. 1a, a number of hollowless solid particles are dispersed on the surface of a pressure-sensitive adhesive layer to form a layer. This state is shown in a more model-like representation in FIG. 1b. In FIG. 2a, some of a number of solid particles are present on the surface of the pressure-sensitive adhesive layer 1; others are partly embedded in the adhesive layer 1 and partly protrude over the surface; and still others are embedded in the surface layer of the adhesive layer 1, thus forming a layer of the dispersed solid particles. This state is shown in a more model-like representation in FIG. 2b. In FIG. 3a, a number of solid particles are partly embedded in the adhesive layer 1 and partly protrude over the surface, thus forming a layer of the dispersed solid particles. This state is shown in a more model-like representation in FIG. 3b. In FIG. 4a, a number of solid particles are embedded almost completely in the surface layer of the adhesive layer 1 and this state is shown in a more model-like representation in FIG. 4b.

In the preparation of the pressure-sensitive adhesive layer of this invention, there is no restriction on means for dispersing the solid particles uniformly on the surface, or in the surface layer, of the adhesive layer. As stated above, there can, for example, be used any means capable of applying a powder in the dispersed state, such as an ordinary powder applicator, a powder sprinkler, or a powdery sprayer. Alternatively, the solid particles are dispersed in a suitable dispersing medium, and the resulting slurry is applied to the surface of the pressure-sensitive adhesive layer by coating or spraying or otherwise, followed by drying. It is also possible to distribute an excessive amount of the solid particles and then remove the excess of the particles by a brush or other suitable scraper means. The solid particles may be applied directly to the surface of the pressure-sensitive adhesive layer. Or it may first be applied to a suitable carrier such as a release paper and then transferred to the adhesive layer.

In bonding the pressure-sensitive adhesive layer of this invention, required pressures may be applied by any desired means, for example by using hand, rubber rolls, or a squeegee. In the prior art, it is necessary to apply pressures sufficient to break the solid hollow balloons or the protective outer covering. But in the present invention, no such special consideration is required, and the bonding operation is easy.

In producing a pressure-sensitive adhesive sheet structure composed of a sheet-like substrate and the pressure-sensitive adhesive layer of the invention, the manufacturing techniques for ordinary pressure-sensitive adhesive sheets can be employed except that additionally a technique is required for dispersing the aforesaid solid particles on at least one surface, or in at least one surface layer, of the pressure-sensitive adhesive layer. For example, it can be produced simply by dispersing the solid particles on a release paper by a powder applicator or another suitable means, applying a pressure-sensitive adhesive to the layer of the dispersed solid particles in a customary manner, and bonding a suitable substrate sheet to the adhesive layer.

Since the surface of the adhesive layer in accordance with this invention is normally non-adhesive, a product obtained by applying the pressure-sensitive adhesive layer may be such in which no release paper is used or a protective paper not treated with a releasing agent is provided. However, it is generally preferred to produce a bonded article having release paper in order to prevent intrusion and dispersion of the non-adhesive solid particles in the adhesive which may occur by application of some pressure during storage.

The following examples illustrate the present invention more specifically. All parts in these examples are by weight unless otherwise specified.

The various tests given in these examples were performed by the following methods at a temperature of 25° C. and a humidity of 65%.

(a) Finger touch tack

The test specimen was cut to a size of 100×100 mm. After removing the release paper, the surface of the adhesive layer was touched by a finger so as to observe stickiness.

The result was evaluated on the following three scales.

O . . . Almost no stickness.

Δ . . . There was some stickiness. The test specimen stuck to the finger, but it was impossible to raise the specimen in this state.

X . . . Great stickness. The test specimen completely stuck to the finger, and could be raised in this state.

(b) Loop tack

This test was performed by using a Tensilon universal tester (Model UTM-4 made by Toyo-Baldwin Co., Ltd.).

The test specimen was cut to a size of 20×50 mm. The release paper was removed, and then 15 mm-portions at both ends of the specimen, the adhesive surface up, were matched with each other. The matched part was held between the chucks of the tester to form a loop having a circumferential length of 20 mm.

Then, a polished steel sheet (SUS 404), stipulated in JIS Z-0237, was raised at a speed of 300 mm/min. and contacted with the loop. The distance from the steel sheet to the lowermost part of the chucks was set at 5 mm.

When the rising of the steel sheet ended, the loop of the test specimen in the collapsed state contacted the steel sheet. The steel sheet was kept stationary in this condition for 10 seconds, and then caused to descend at a speed of 300 mm/min. The adhesion strength between the steel sheet and the test specimen at this time was defined as the loop tack.

(c) Slidability on an adherend

The test specimen was cut to a size of 25×150 mm. The release paper was removed, and the specimen was placed, with its adhesive surface down, on an acrylic paint-coated plate (mde by Japan Test Panel Co., Ltd.).

The test specimen was slid to and fro by hand manipulation to examine its freedom of movement. The result was evaluated on the following three scales.

O . . . The test specimen could be freely slid on the adherend.

Δ . . . Adhesive force developed partly, and the sliding of the test specimen was not free.

X . . . The movement of the test specimen was difficult.

(d) Adhesion strength

The test specimen was cut to a size of 10×200 mm. The release paper was removed, and the test specimen was pressure-bonded to an acrylic paint-coated plate (made by Japan Test Panel Co., Ltd.) by using the pressure bonding device stipulated in JIS Z-0237.

After a predetermined period of time, the 180° peel strength was measured by using a Tensilon universal tester at a pulling speed of 200 mm/min.

(e) Surface condition of the substrate after bonding

The test specimen was cut to a size of 30×50 mm. The release paper was removed, and then the test specimen was bonded to a steel sheet (SUS 304) in accordance with JIS Z-0237.

Then, the ten point height of the surface of the test specimen was measured substantially in accordance with JIS B-0601, and ISO (International Organization for Standardization) R 468 by using a surface roughness shape measuring instrument (Surfcom 201A made by Tokyo Seimitsu K.K.).

EXAMPLE 1

Fine particles of calcium carbonate having an average particle diameter of about $0.6\mu$ ("NCC #410", a product made by Nitto Funka Kogyo Kabushiki Kaisha) were dispersed over release paper (KOM-11, made by Shinkoku Seishi Kabushiki Kaisha). Initially, the calcium carbonate particles were scattered excessively on the release paper, and then dispersed uniformly on the surface by using a brush. The excess was then removed by a scraper. The amount of the calcium carbonate particles distributed was about 1 g/m².

A mixture obtained by stirring 100 parts of an acrylic adhesive (made by Nitsusetsu Kabushiki Kaisha), 1 part of an isocyanate-type crosslinking agent (made by Nippon Polyurethan Kogyo Kabushiki Kaisha) and 15 parts of ethyl acetate was coated to a thickness of 30 g/m² as solids, and dried. The resulting adhesive layer had an average thickness of about $30\mu$.

A vinyl chloride resin film ("Hi-S Paint", made by Nippon Carbide Kogyo Kabushiki Kaisha) was pressure-bonded onto the adhesive layer to form a pressure-sensitive adhesive sheet.

Using this pressure-sensitive sheet, the effects of the present invention were examined. The results are shown in Table 1. The sheet had a sufficiently low initial adhesion strength, and could be slid freely over an adherend. After bonding, it exhibited a sufficient adhesion strength and its surface was very smooth.

EXAMPLE 2

A pressure-sensitive adhesive sheet was produced in the same way as in Example 1 except that fine particles of calcium carbonate having an average particle diameter of about $6\mu$ ("NCC #45" made by Nitto Funka Kogyo Kabushiki Kaisha) were used.

The resulting pressure-sensitive adhesive sheet was tested in the same way as in Example 1 to examine the effects of this invention. As shown in Table 1, the rate of increasing of the adhesion strength of the sheet with time after bonding was slightly lower than that in the sheet obtained in Example 1. The initial adhesion strength, and surface condition of the sheet were as good as in Example 1.

EXAMPLE 3

A pressure-sensitive adhesive sheet was produced in the same way as in Example 1 except that aluminum hydroxide having an average particle diameter of about 1μ (made by Showa Keikinzoku Kabushiki Kaisha) was used.

The resulting pressure-sensitive adhesive sheet was tested in the same way as in Example 1 to examine the effects of the invention. As shown in Table 1, the rate of increase of the adhesion strength of the sheet with time after bonding was intermediate between those of the sheets obtained in Examples 1 and 2. The initial adhesion strength, and the surface condition of the sheet were as good as in Example 1.

COMPARATIVE EXAMPLE 1

A pressure-sensitive adhesive sheet was produced in the same way as in Example 1 except that aluminum hydroxide having an average particle diameter of about 25μ (made by Showa Keikinzoku Kabushiki Kaisha) was used.

The resulting sheet was tested in the same way as in Example 1 to make a comparison with the Examples. As shown in Table 1, the rate of increase of the adhesion strength of the resulting sheet with time after bonding was lower than in the pressure-sensitive adhesive sheets obtained in the Examples, and even after the lapse of 1 hour from bonding, the adhesion strength was 0.08 kg f/cm. The sheet tended to separate from the adherend, and was not practical. Furthermore, the surface condition of the sheet was poor. Hence, the sheet obtained in this Comparative Example was quite unsuitable at a pressure-sensitive adhesive sheet.

COMPARATIVE EXAMPLE 2

An adhesive solution was prepared by mixing 100 parts of an acrylic adhesive (made by Nitsusetsu Kabushiki Kaisha), 1 part of an isocyanate-type crosslinking agent (made by Nippon Polyurethan Kogyo Kabushiki Kaisha) and 15 parts of ethyl acetate with stirring. Then, 1.2 parts of the same calcium carbonate particles as used in Example 1 having an average particle diameter of about 0.6μ were added to the adhesive solution. The mixture was stirred until calcium carbonate was fully dispersed.

The dispersion was coated on the same release paper as used in Example 1 to a thickness of 30 g/m² as solids, and dried. The resulting adhesive layer had an average thickness of about 30μ, and the amount of calcium carbonate distributed was about 1 g/m².

The same vinyl chloride resin film as used in Example 1 was pressure-bonded to the adhesive layer to form a pressure-sensitive adhesive sheet.

The resulting sheet was tested in the same way as in Example 1 to make a comparison with the Examples.

The pressure-sensitive adhesive sheet obtained in this Comparative Example had a much higher initial adhesion strength than the pressure-sensitive adhesive sheets shown in the Examples. Its movement over an adherend was extremely limited, and it was very difficult to relocate it, and move it to the desired site of bonding.

COMPARATIVE EXAMPLE 3

As one example of a pressure-sensitive adhesive sheet in which hollow microballoons are distributed over the surface of the adhesive layer, "Control-Tac 180-10", a tradename for a product of Minnesota Mining and Manufacturing Company, was tested in the same way as in Example 1 to compare it with the products of the present invention.

As shown in Table 1, the pressure-sensitive adhesive sheet of this Comparative Example had worse initial adhesiveness and a lower rate of increase of adhesion strength with time after bonding than the pressure-sensitive adhesive sheet of this invention. Its surface condition was also much worse.

REFERENTIAL EXAMPLE

As an example of a general adhesive sheet, "Cutting Sheet Tuffcal" (a tradename for a product of K.K. Nakagawa Chemical) was tested in the same way as in Example 1 to compare its properties with those of the products of this invention.

As shown in Table 1, the adhesive sheet of this Referential Example had a much higher initial adhesion strength than the pressure-sensitive adhesive sheets of this invention. Its movement on an adherend was very much limited, and it was very difficult to register it with the desired site of bonding or to relocate it to the desired site of bonding.

TABLE 1

| | Non-adhesive particles | | Finger touch tack | Loop tack (g f/cm) | Slidability on adherend | Adhesion strength (kg f/cm) Elapsed time after pressure bonding | | | | | Surface condition of the substrate after pressure bonding (μ) |
|---|---|---|---|---|---|---|---|---|---|---|---|
| | Type | Average diameter (μ) | | | | 1 min. | 10 min. | 1 hr. | 24 hrs. | 7 days | |
| Example 1 | Calcium carbonate | 0.6 | O | 0 | O | 0.03 | 0.16 | 0.37 | 0.60 | 0.75 | 2 |
| Example 2 | Calcium carbonate | 6 | O | 0 | O | 0.01 | 0.08 | 0.24 | 0.47 | 0.60 | 2 |
| Example 3 | Aluminum hydroxide | 1 | O | 0 | O | 0.03 | 0.12 | 0.30 | 0.58 | 0.70 | 2 |
| Comparative Example 1 | Aluminum hydroxide | 25 | O | 0 | O | 0.01 | 0.02 | 0.08 | 0.18 | 0.27 | 5 |
| Comparative Example 2 | Calcium carbonate | 0.6 | X | 420 | X | 0.49 | 0.55 | 0.58 | 0.65 | 0.73 | 2 |
| Comparative Example 3 | Hollow microballoons | about 40 | X | 370 | Δ | 0.40 | 0.43 | 0.48 | 0.51 | 0.59 | 6 |
| Referential Example | — | — | X | 560 | X | 0.54 | 0.57 | 0.61 | 0.66 | 0.72 | 2 |

What we claim is:

1. A pressure-sensitive adhesive sheet structure having relocatable properties comprising a pressure-sensitive adhesive layer and a layer of non-adhesive solid particles; said solid particles having a diameter smaller than the thickness of the adhesive layer and an average diameter of less than 10μ and said solid particles in said layer being randomly but uniformly distributed over the surface of the adhesive layer, wherein the ratio of the thickness in μ of the adhesive layer to the average diameter in μ of the solid particles is at least 2.

2. The structure of claim 1 wherein the average diameter of said solid particles is not more than 6μ.

3. The structure of claim 1 or 2 wherein the ratio of the thickness in μ of the adhesive layer to the average diameter in μ of the solid particles is at least 10.

4. The structure of claim 1 wherein the thickness of the adhesive layer is from 10 to 100μ.

5. The structure of claim 1 wherein said solid particles are neither collapsible nor fragile under conditions employed for pressure-bonding said sheet structure to a desired site of bonding.

6. The structure of claim 1 wherein the pressure-sensitive adhesive layer is comprised of a pressure-sensitive adhesive having tackiness at room temperature and selected from the group consisting of natural rubber adhesives, synthetic rubber adhesives acrylic adhesives, vinyl acetate adhesives, urethane adhesives, and mixtures thereof.

7. The structure of claim 6 wherein the pressure-sensitive adhesive is a natural rubber adhesive or synthetic rubber adhesive.

8. The structure of claim 6 wherein the pressure-sensitive adhesive is an acrylic adhesive.

9. The structure of claim 6 wherein the pressure-sensitive adhesive is an acetate adhesive.

10. The structure of claim 6 wherein the pressure-sensitive adhesive is a urethane adhesive.

11. The structure of claim 1 wherein at least some of the solid particles are uniformly distributed on the surface of the adhesive layer.

12. The structure of claim 1 wherein at least some of the solid particles are partially embedded in the surface layer of the adhesive layer.

13. The structure of claim 1 wherein at least some of the solid particles are embedded in the surface layer of the adhesive layer.

* * * * *

UNITED STATES PATENT AND TRADEMARK OFFICE
CERTIFICATE OF CORRECTION

PATENT NO. : 4,556,595
DATED : December 3, 1985
INVENTOR(S) : KATSURA OCHI

It is certified that error appears in the above-identified patent and that said Letters Patent is hereby corrected as shown below:

ON THE TITLE PAGE

[73]    Assignee:    After "Nippon Carbide Kogyo Kabushiki Kaisha" insert --Tokyo, Japan--.

Signed and Sealed this

Fourth Day of February 1986

[SEAL]

Attest:

DONALD J. QUIGG

Attesting Officer      Commissioner of Patents and Trademarks